United States Patent
Zheng

(10) Patent No.: US 9,810,915 B2
(45) Date of Patent: Nov. 7, 2017

(54) DISPLAY PANEL, THREE-DIMENSIONAL DISPLAY DEVICE AND MANUFACTURING METHOD THEREOF, AND THREE-DIMENSIONAL DISPLAY SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiaoyi Zheng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 166 days.

(21) Appl. No.: 14/422,813

(22) PCT Filed: Apr. 25, 2014

(86) PCT No.: PCT/CN2014/076241
§ 371 (c)(1),
(2) Date: Feb. 20, 2015

(87) PCT Pub. No.: WO2015/096327
PCT Pub. Date: Jul. 2, 2015

(65) Prior Publication Data
US 2016/0041400 A1 Feb. 11, 2016

(30) Foreign Application Priority Data
Dec. 25, 2013 (CN) .......................... 2013 1 0728309

(51) Int. Cl.
*H04N 13/04* (2006.01)
*G02B 27/26* (2006.01)
(Continued)

(52) U.S. Cl.
CPC ........... *G02B 27/26* (2013.01); *G02F 1/1313* (2013.01); *G02F 1/133308* (2013.01);
(Continued)

(58) Field of Classification Search
CPC .... G02B 27/26; G02B 27/22; G02B 27/2278; G02B 27/2214; G02B 27/2228;
(Continued)

(56) References Cited

U.S. PATENT DOCUMENTS 6,348,957 B1 * 2/2002 Yamazaki ......... G02F 1/133528
348/E13.038
2004/0012851 A1 * 1/2004 Sato ....................... G02B 27/26
359/464
(Continued)

FOREIGN PATENT DOCUMENTS

| CN | 101881905 A | 11/2010 |
|---|---|---|
| CN | 102200644 A | 9/2011 |

(Continued)

OTHER PUBLICATIONS

3rd Office Action issued in corresponding Chinese application No. 201310728309.8 dated Jun. 3, 2016.
(Continued)

*Primary Examiner* — Joseph L Williams
*Assistant Examiner* — Jose M Diaz
(74) *Attorney, Agent, or Firm* — Nath, Goldberg & Meyer; Joshua B. Goldberg

(57) ABSTRACT

The present invention discloses a display panel, a three-dimensional display device and manufacturing method thereof. The display panel comprises a plurality of display regions. At least one of the plurality of display regions is configured to display a first display picture, while the rest of the plurality of display regions are configured to display a second display picture. A frame of display picture comprises the first display picture and the second display picture. When the frame of display picture is displayed, the polarization direction of the first display picture is different from that of the second display picture. In the technical solutions pro-
(Continued)

vided by the present invention, it is unnecessary to arrange a liquid crystal cell on a display panel, so the production cost is reduced.

18 Claims, 9 Drawing Sheets

(51) Int. Cl.
    *G02F 1/13*      (2006.01)
    *G02F 1/1333*      (2006.01)
    *G02F 1/1335*      (2006.01)
    *G02F 1/139*      (2006.01)

(52) U.S. Cl.
    CPC ... *G02F 1/133528* (2013.01); *H04N 13/0434* (2013.01); *G02F 1/1393* (2013.01); *G02F 2203/50* (2013.01)

(58) Field of Classification Search
    CPC ............ G02B 27/2207; G02B 27/2264; G02B 21/22; G02F 1/1313; G02F 1/133528; G02F 1/133308; G02F 2203/50; G02F 1/1393; H04N 13/0434
    See application file for complete search history.

(56) References Cited

U.S. PATENT DOCUMENTS

| | | | | |
|---|---|---|---|---|
| 2011/0063424 A1* | 3/2011 | Matsuhiro | .......... | H04N 13/0434 348/58 |
| 2012/0081525 A1* | 4/2012 | Akashi | ............... | H04N 13/0055 348/51 |
| 2012/0105749 A1* | 5/2012 | Tseng | .................. | G02B 27/2242 349/15 |
| 2012/0182406 A1* | 7/2012 | Woo | .................... | G02B 27/2264 348/54 |
| 2014/0132863 A1* | 5/2014 | Chang | ................ | H04N 13/0404 349/15 |
| 2014/0192174 A1* | 7/2014 | Park | .................... | H04N 13/0438 348/56 |

FOREIGN PATENT DOCUMENTS

| | | | | |
|---|---|---|---|---|
| CN | 102269890 A | 12/2011 | | |
| CN | 102317842 A | 1/2012 | | |
| CN | 202166803 U | 3/2012 | | |
| CN | 102725675 A | 10/2012 | | |
| CN | 103002308 A | 3/2013 | | |
| KR | WO 2014109479 A1 * | 7/2014 | ......... | H04N 13/0438 |

OTHER PUBLICATIONS

Chinese First Office Action dated Aug. 24, 2015 corresponding to Chinese application No. 201310728309.8.
Written Opinion of the International Searching Authority dated Aug. 24, 2015 corresponding to International application No. PCT/CN2014/076241.
Search Report issued in International Application No. PCT/CN2014/076241, dated Apr. 25, 2014 (Apr. 25, 2014).

* cited by examiner

DISPLAY PANEL, THREE-DIMENSIONAL DISPLAY DEVICE AND MANUFACTURING METHOD THEREOF, AND THREE-DIMENSIONAL DISPLAY SYSTEM

This is a National Phase Application filed under 35 U.S.C. 371 as a national stage of PCT/CN2014/076241 filed on Apr. 25, 2014, an application claiming the benefit to Chinese application No. 201310728309.8 filed on Dec. 25, 2013; the content of each of which is hereby incorporated by reference in its entirety.

FIELD OF THE INVENTION

The present invention relates to the technical field of display, and particularly to a display panel, a three-dimensional display device and manufacturing method thereof and a three-dimensional display system.

BACKGROUND OF THE INVENTION

The vision-aided 3D display technology refers to a display technology capable of watching 3D effect with the aid of 3D glasses, 3D helmets or other vision-aided equipment. The vision-aided 3D display technology mainly includes: color separation 3D display technology, polarizing 3D display (Film Pattern Retarder, FPR for short) technology, shutter 3D display (Shutter Glass, SG for short) technology or helmet 3D display technology, etc. The color separation 3D display technology is a vision-aided 3D display technology, based on the spectral principle of colors, for allowing the left eye and the right eye to watch left and right parallax images of different spectrums so as to achieve 3D effect if an audience wears a pair of color separation glasses. The polarizing 3D display technology is a display technology, based on the polarization principle of light and the binocular parallax principle, for allowing the left eye and right eye of an audience who wears a pair of polarizing glasses to watch parallax images in different polarization directions so as to achieve 3D effect. The shutter 3D display technology allows an audience who wears a pair of synchronous timing shutter glasses to watch left and right parallax images sequentially and alternately displayed on a display screen so as to watch a 3D image. The helmet 3D display provides left and right parallax images to an audience by using two relatively independent display screens and allows the audience to be completely immersed in the displayed scene. If the left and right images displayed by the helmet are an image pair with horizontal parallax in a same scene, the audience may watch the 3D image of this scene.

At present, the mainstream vision-aided 3D display technology includes shutter 3D display technology and polarizing 3D display technology. The timing shutter glasses used by the polarizing 3D display technology are relatively expensive, but displayed pictures may keep fairly high resolution and quality. The polarizing glasses used by the polarizing 3D display technology is relatively cheaper, but the displayed picture is relatively rough as each eye only sees half of a picture. In view of the advantages and disadvantages of the shutter 3D display technology and the polarizing 3D display technology, RealD has proposed an RDZ technology in 2011. The RDZ display technology is a technology between the shutter 3D display technology and the polarizing 3D display technology. The RDZ display technology employs cheap polarizing glasses, and the improvement to a display panel is that an additional liquid crystal cell (Pi-Cell) is arranged in front of the display panel, so that high-speed switchover is performed between two polarization directions during displaying, and two eyes of an audience may see different images. In comparison to the shutter 3D display technology and the polarizing 3D display technology, the RDZ display technology mainly has the following advantages: 1) the screen resolution may reach the screen resolution of the shutter 3D display technology; 2) the glasses have cheap price and light weight; and, 3) the picture brightness loss is less than those of the shutter 3D display technology and the polarizing 3D display technology.

In the conventional RDZ technology, a liquid crystal cell is attached onto a display panel. The liquid crystal state of the liquid crystal cell includes a bent state and a vertical state. FIG. 1a is a schematic diagram of a liquid crystal cell at a bent state, and FIG. 1b is a schematic diagram of a liquid crystal cell at a vertical state. As shown in FIG. 1a, the liquid crystal in the liquid crystal cell is at a bent state when no voltage is applied to the liquid crystal cell. In this case, if incident polarized light passes through the liquid crystal cell, the phase is delayed by Pi ($\pi$), that is, the polarization direction of the polarized light is rotated by 90 degrees, so that the polarization direction of the polarized light passing through the liquid crystal cell is vertical to the polarization direction of the incident polarized light. As shown in FIG. 1b, the liquid crystal in the liquid crystal cell is at a vertical state when a voltage is applied to the liquid crystal cell. In this case, if incident polarized light passes through the liquid crystal cell, the phase is not delayed, that is, the polarization direction of the polarized light remains unchanged, so that the polarization direction of the polarized light passing through the liquid crystal cell is identical to the polarization direction of the incident polarized light.

FIG. 1c is a schematic diagram of a working principle of an RDZ system in the prior art, and FIG. 1d is another schematic diagram of the working principle of an RDZ system in the prior art. As shown in FIG. 1c and FIG. 1d, the RDZ system includes a display panel 11 and a pair of polarizing glasses. A liquid crystal cell is arranged on the display panel 11, and a +$\lambda$/4 slide 14 is arranged on the liquid crystal cell. The pair of polarizing glasses includes a left polarizer 17 and a right polarizer 18. The left polarizer 17 is provided thereon with a −$\lambda$/4 slide 15, while the right polarizer 18 is provided thereon with a +$\lambda$/4 slide 16. Both the polarization direction of the left polarizer 17 and the polarization direction of the right polarizer 18 are a horizontal direction. Wherein, FIG. 1c shows the working principle of the $n^{th}$ frame of display picture, and FIG. 1d shows the working principle of the $(n+1)^{th}$ frame of display picture. The liquid crystal cell includes a display region 12 and a display region 13. The display region 12 is located above the display region 13. The display region 12 faces an upper half region of the display panel 11, while the display region 13 faces a lower half region of the display panel 11. As shown in FIG. 1c, during displaying the $n^{th}$ frame of display picture, the liquid crystal state of the display region 12 is a vertical state, and the liquid crystal state of the display region 13 is a bent state. The polarization direction of a first display picture displayed by the upper half region of the display panel 11 is a horizontal direction, and the polarization direction is still the horizontal direction after the first display picture transmits through the display region 12 with a vertical state as the liquid crystal state; however, the polarization direction of a second display picture displayed by the lower half region of the display panel 11 is a horizontal direction, but the polarization direction is turned into a vertical direction after the second display picture transmits through the display region 13 with a bent state as the liquid crystal state. The first display picture and the second display picture are turned into circular polarized light in different rotation directions after passing through the +λ/4 slide 14. Subsequently, the first display picture successively passes through the −λ/4 slide 15 and the left polarizer 17 and then is received by the left eye of a user, while the second display picture successively passes through +λ/4 slide 16 and the right polarizer 18 and then is received by the right eye of the user. As shown in FIG. 1*d*, during displaying the (n+1)$^{th}$ frame of display picture, the liquid crystal state of the display region 12 is a bent state, and the liquid crystal state of the display region 13 is a vertical state. The polarization direction of a second display picture displayed by the upper half region of the display panel 11 is a horizontal direction, and the polarization direction is turned into a vertical direction after the second display picture transmits through the display region 12 with a bent state as the liquid crystal state; however, the polarization direction of a first display picture displayed by the lower half region of the display panel 11 is a horizontal direction, but the polarization direction is still the horizontal direction after the first display picture transmits through the display region 13 with a vertical state as the liquid crystal state. The first display picture and the second display picture are turned into circular polarized light in different rotation directions after passing through the +λ/4 slide 14. Subsequently, the first display picture successively passes through the −λ/4 slide 15 and the left polarizer 17 and then is received by the left eye of a user, while the second display picture successively passes through +λ/4 slide 16 and the right polarizer 18 and then is received by the right eye of the user.

In conclusion, the display panel 11 realizes partition polarization display by a liquid crystal cell. After passing through two display regions of the liquid crystal cell, the polarization direction of a first display picture is vertical to that of a second display picture. The two display regions of the liquid crystal cell are switched between a bent state and a vertical state, thereby realizing a high-speed switchover between two polarization states. As both the driving frequency of the first display picture and that of the second display picture are 120 Hz, in two adjacent frames of display pictures, the left eye receives one complete left-eye parallax picture every ¹⁄₆₀ s, while the right eye receives one complete right-eye parallax picture every ¹⁄₆₀ s.

However, in the prior art, a liquid crystal cell needs to be attached onto a display panel. As the display panel is large in size, the liquid crystal cell needs to have many raw materials, and the technological process of attaching the liquid crystal cell onto the display panel is relatively complicated, so that the production cost is greatly improved.

SUMMARY OF THE INVENTION

The present invention provides a display panel, a three-dimensional display device and manufacturing method thereof and a three-dimensional display system for the purpose of reducing production cost.

To achieve the above objective, the present invention provides a display panel, including a plurality of display regions, wherein at least one of the plurality of display regions is configured to display a first display picture, while the rest of the plurality of display regions are configured to display a second display picture; a frame of display picture comprises the first display picture and the second display picture; and, when this frame of display picture is displayed, the polarization direction of the first display picture is different from that of the second display picture.

Optionally, the display region for displaying the first display picture is provided with a first sub-polarizer, so that the polarization direction of the first display picture is identical to that of the first sub-polarizer; the display region for displaying the second display picture is provided with a second sub-polarizer, so that the polarization direction of the second display picture is identical to that of the second sub-polarizer; and, the polarization direction of the first sub-polarizer is different from that of the second sub-polarizer.

Optionally, the number of the display region for displaying the first display picture is equal to that of the display region for displaying the second display picture.

Optionally, there is one display region for displaying the first display picture, and there is one display region for displaying the second display picture.

Optionally, in two adjacent frames of display pictures, the polarization directions of the first display pictures are different and the polarization directions of the second display pictures are different.

Optionally, the display panel includes an organic light-emitting diode display unit or a plasma display unit.

To achieve the above objective, the present invention provides a three-dimensional display device, including a first polarizer and a second polarizer, wherein the first polarizer is provided thereon with a first liquid crystal cell for allowing the polarization direction of a first display picture to be identical to that of the first polarizer; the second polarizer is provided therein with a second liquid crystal cell for allowing the polarization direction of a second display picture to be identical to that of the second polarizer; a frame of display picture comprises the first display picture and the second display picture; and, when this frame of display picture is displayed, the polarization direction of the first display picture is different from that of the second display picture.

Optionally, if the polarization direction of the first display picture received by the first liquid crystal cell is different from that of the first polarizer, the liquid crystal state of the first liquid crystal cell comprises a bent state; or if the polarization direction of the first display picture received by the first liquid crystal cell is identical to that of the first polarizer, the liquid crystal state of the first liquid crystal cell comprises a vertical state.

Optionally, if the polarization direction of the second display picture received by the second liquid crystal cell is different from that of the second polarizer, the liquid crystal state of the second liquid crystal cell comprises a bent state; or if the polarization direction of the second display picture received by the second liquid crystal cell is identical to that of the second polarizer, the liquid crystal state of the second liquid crystal cell comprises a vertical state.

Optionally, the polarization direction of the first polarizer is identical to that of the second polarizer, or the polarization direction of the first polarizer is vertical to that of the second polarizer.

Optionally, the three-dimensional display device further includes a mirror bracket, wherein the first polarizer, the second polarizer, and the first liquid crystal cell and the second liquid crystal cell arranged on the first polarizer respectively and the second polarizer are all arranged on the mirror bracket.

To achieve the above objective, the present invention provides a three-dimensional display system, including the above-mentioned display panel and the above-mentioned three-dimensional display device.

To achieve the above objective, the present invention provides a manufacturing method of a three-dimensional display device, including the following steps:

preparing a first polarizer and a second polarizer;

disposing a first liquid crystal cell on the first polarizer, wherein the first liquid crystal cell is configured to allow the polarization direction of a first display picture to be identical to that of the first polarizer; and disposing a second liquid crystal cell on the second polarizer, wherein the second liquid crystal cell is configured to allow the polarization direction of a second display picture to be identical to that of the second polarizer, a frame of display picture includes the first display picture and the second display picture, the polarization direction of the first display picture is different from that of the second display picture when this frame of display picture is displayed.

Optionally, the step of disposing a first liquid crystal cell on the first polarizer includes: attaching the first liquid crystal cell onto the first polarizer; and the step of disposing a second liquid crystal cell on the second polarizer includes: attaching the second liquid crystal cell onto the second polarizer.

To achieve the above objective, the present invention provides a three-dimensional display method using the above three-dimensional display system, including the following steps:

displaying a frame of display picture by a display panel, wherein the frame of display picture includes the first display picture and the second display picture, the polarization direction of the first display picture is different from that of the second display picture;

receiving the first display picture by a first liquid crystal cell, and allowing the polarization direction of the first display picture to be identical to that of a first polarizer;

receiving the second display picture by a second liquid crystal cell, and allowing the polarization direction of the second display picture to be identical to that of a second polarizer;

receiving, by the first polarizer, the first display picture having a polarization direction identical to that of the first polarizer; and receiving, by the second polarizer, the second display picture having a polarization direction identical to that of the second polarizer.

The present invention has the following beneficial effects:

In the technical solutions of the display panel, the three-dimensional display device and manufacturing method thereof and the three-dimensional display system provided by the present invention, the display panel displays a first display picture and a second display picture in a partition and polarization manner. In the three-dimensional display device, the first polarizer is provided thereon with a first liquid crystal cell and the second polarizer is provided thereon with a second liquid crystal cell, so it is unnecessary to arrange a liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced.

DETAILED DESCRIPTION OF THE EMBODIMENTS

To make those skilled in the art better understand the technical solutions of the present invention, the display panel, the three-dimensional display device and manufacturing method thereof and the three-dimensional display system provided by the present invention will be described below in details with reference to the accompanying drawings.

Figure 2:
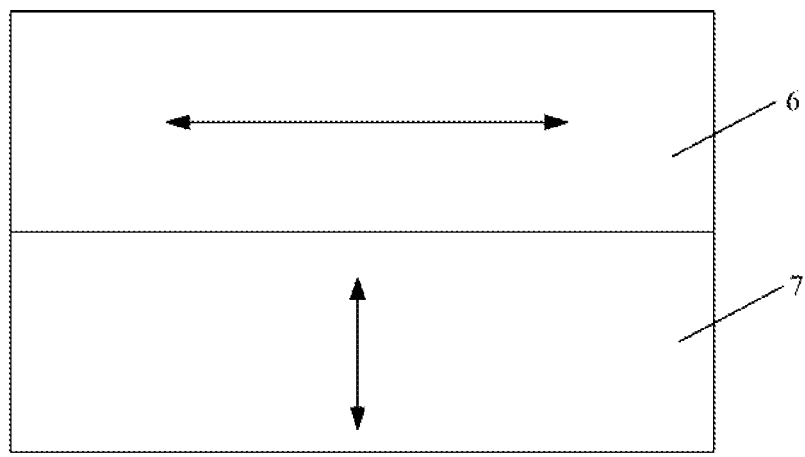
FIG. 2 is a structural diagram of a display panel according to Embodiment 1 of the present invention.

FIG. 2 is a structural diagram of a display panel according to Embodiment 1 of the present invention. As shown in FIG. 2, the display panel includes a plurality of display regions. At least one of the plurality of display regions is configured to display a first display picture, and the rest of the plurality of display regions is configured to display a second display picture. One frame of display picture includes a first display picture and a second display picture. When one frame of display picture is displayed, the polarization direction of the first display picture is different from that of the second display picture.

In this embodiment, the display panel is used for displaying a display picture. In one frame of display picture, the display picture may include a first display picture and a second display picture. That is, the first display picture and the second display picture form one frame of display picture. Specifically, the display panel is divided into a plurality of display regions, wherein a part of the display regions is configured to display the first display picture, and the rest of the display regions is configured to display the second display picture, so that the display panel may display the first display picture and the second display picture in one frame of display picture by using different display regions.

In this embodiment, preferably, the display panel may be an Organic Light-Emitting Diode (OLED for short hereinafter) panel or a plasma panel. That is, the display panel in this embodiment may include an organic light-emitting diode display unit or a plasma display unit.

In this embodiment, the number of the display region for displaying the first display picture is equal to that of the display region for displaying the second display picture. Preferably, there is one display region for displaying the first display picture, and there is one display region for displaying the second display picture. As shown in FIG. 2, this embodiment is described by taking two display regions as an example, the display panel includes a display region 6 and a display region 7, and the display region 6 is located above the display region 7. The display region 6 may be configured to display the first display picture, and the display region 7 may be configured to display the second display picture; or, the display region 6 may be configured to display the second display picture, and the display region 7 may be configured to display the first display picture. When the display region 6 displays the first display picture, the polarization direction of the first display picture is a horizontal direction; and, when the display region 7 displays the second display picture, the polarization direction of the second display picture is a vertical direction. When the display region 6 displays the second display picture, the polarization direction of the second display picture is a horizontal direction; and, when the display region 7 displays the first display picture, the polarization direction of the first display picture is a vertical direction. However, those skilled in the art should understand that, in practical applications, there may be a plurality of display regions for displaying the first display picture and a plurality of display regions for displaying the second display picture, and the relative position of the display regions for displaying the first display picture and the display regions for displaying the second display picture includes but is not limited to the upper-and-lower position relationship. For example, the relative position may also be left-and-right position relationship.

Preferably, in two adjacent frames of display pictures, the polarization directions of the first display pictures are different and the polarization directions of the second display pictures are different. For example, the polarization direction of the first display picture displayed by the display region 6 in a certain frame of display picture is a horizontal direction, but the polarization direction of the first display picture displayed by the display region 7 in a frame of display picture next to this frame of display picture is a vertical direction, so the polarization directions of the first display pictures in two adjacent frames of display pictures are different. For example, the polarization direction of the second display picture displayed by the display region 7 in a certain frame of display picture is a vertical direction, but the polarization direction of the second display picture displayed by the display region 6 in a frame of display picture next to this frame of display picture is a horizontal direction, so the polarization directions of the second display pictures in two adjacent frames of display pictures are different.

In this embodiment, the display region for displaying the first display picture is provided with a first sub-polarizer, so that the polarization direction of the first display picture is identical to that of the first sub-polarizer; and, the display region for displaying the second display picture is provided with a second sub-polarizer, so that the polarization direction of the second display picture is identical to that of the second sub-polarizer. The polarization direction of the first sub-polarizer is different from that of the second sub-polarizer. As shown in FIG. 2, the display region 6 is provided with a first sub-polarizer with its polarization direction being a horizontal direction, and the display region 7 is provided with a second sub-polarizer with its polarization direction being a vertical direction. As the polarization direction of the first sub-polarizer is the horizontal direction and the polarization direction of the second sub-polarizer is the vertical direction, the first sub-polarizer allows the polarization direction of the first display picture to be the horizontal direction when the display region 6 displays the first display picture, and the second sub-polarizer allows the polarization direction of the second display picture to be the vertical direction when the display region 7 displays the second display picture; or, the first sub-polarizer allows the polarization direction of the second display picture to be the horizontal direction when the display region 6 displays the second display picture, and the second sub-polarizer allows the polarization direction of the first display picture to be the vertical direction when the display region 7 displays the first display picture.

In this embodiment, in the process of displaying a certain frame of display picture, the display region 6 displays the first display picture once, and the display region 7 displays the second display picture once; while in the process of displaying a frame of display picture next to this frame of display picture, the display region 7 displays the first display picture once, and the display region 6 displays the second display picture once. In conclusion, when both the driving frequency of the first display picture and the driving frequency of the second display picture are 120 Hz, one complete left-eye parallax picture (for example, the first display picture with a vertical polarization direction) and one complete right-eye parallax picture (for example, the second display picture with a vertical polarization direction) are displayed every $\frac{1}{60}$ s, so that the full-resolution display effect may be realized.

In the technical solution of the display panel provided by this embodiment, the display panel includes a plurality of display regions; at least one of the plurality of display regions is configured to display a first display picture, and the rest of the plurality of display regions is configured to display a second display picture; and, when one frame display picture is displayed, the polarization direction of the first display picture is different from that of the second display picture. In this embodiment, as the first display picture and the second display picture are displayed in a partition and polarization manner, it is unnecessary to arrange a liquid crystal cell on the display panel, so that the production cost is reduced. Meanwhile, it is unnecessary to arrange a λ/4 slide on the display panel, so the production cost is further reduced, and the technological process is simplified.

Figure 3A:
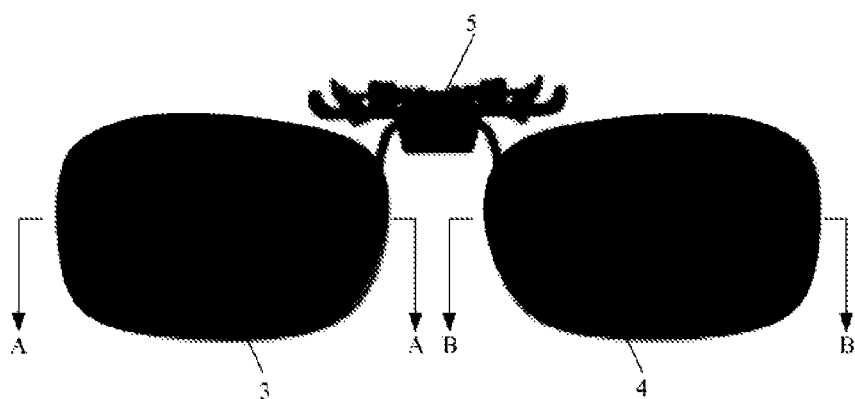
FIG. 3a is a structural diagram of a three-dimensional display device according to Embodiment 2 of the present invention.
Figure 3B:
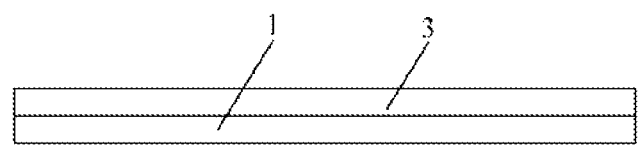
FIG. 3b is a sectional view of FIG. 3a taken along A-A direction.
Figure 3C:
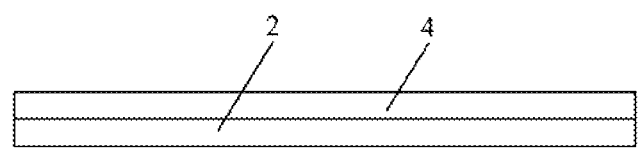
FIG. 3c is a sectional view of FIG. 3a taken along B-B direction.

FIG. 3a is a structural diagram of a three-dimensional display device according to Embodiment 2 of the present invention, FIG. 3b is a sectional view of FIG. 3a taken along A-A direction, and FIG. 3c is a sectional view of FIG. 3a taken along B-B direction. As shown in FIG. 3a, FIG. 3b and FIG. 3c, the three-dimensional display device includes a first polarizer 1 and a second polarizer 2. The first polarizer 1 is provided thereon with a first liquid crystal cell 3 for allowing the polarization direction of a first display picture to be identical to that of the first polarizer 1. The second polarizer 2 is provided therein with a second liquid crystal cell 4 for allowing the polarization direction of a second display picture to be identical to that of the second polarizer 2. A frame of display picture includes the first display picture and the second display picture. When this frame of display picture is displayed, the polarization direction of the first display picture is different from that of the second display picture.

In this embodiment, a three-dimensional display device may be a pair of three-dimensional glasses. Further, the three-dimensional display device may further include a mirror bracket 5. The first polarizer 1, the second polarizer 2, the first liquid crystal cell 3 and the second liquid crystal cell 4 are all disposed on the mirror bracket 5, so as to form a pair of three-dimensional display glasses for allowing a user to wear.

In this embodiment, the display panel is used for displaying a display picture. In one frame of display picture, the display picture may include a first display picture and a second display picture. That is, the first display picture and the second display picture form one frame of display picture. The specific description of the display panel in this embodiment may refer to FIG. 2 and the description in Embodiment 1, and will not be repeated redundantly here. The first liquid crystal cell 3 is configured to receive the first display picture displayed by the display panel, and the second liquid crystal cell 4 is configured to receive the second display picture displayed by the display panel.

Figure 1A:
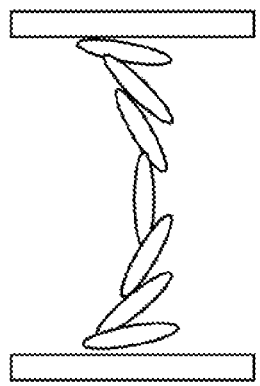
FIG. 1a is a schematic diagram of a liquid crystal cell at a bent state.
Figure 1B:
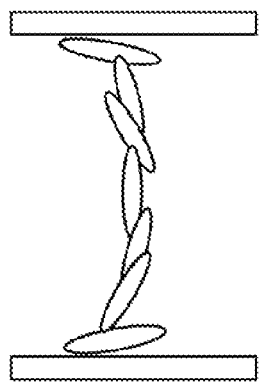
FIG. 1b is a schematic diagram of a liquid crystal cell at a vertical state.
Figure 1C:
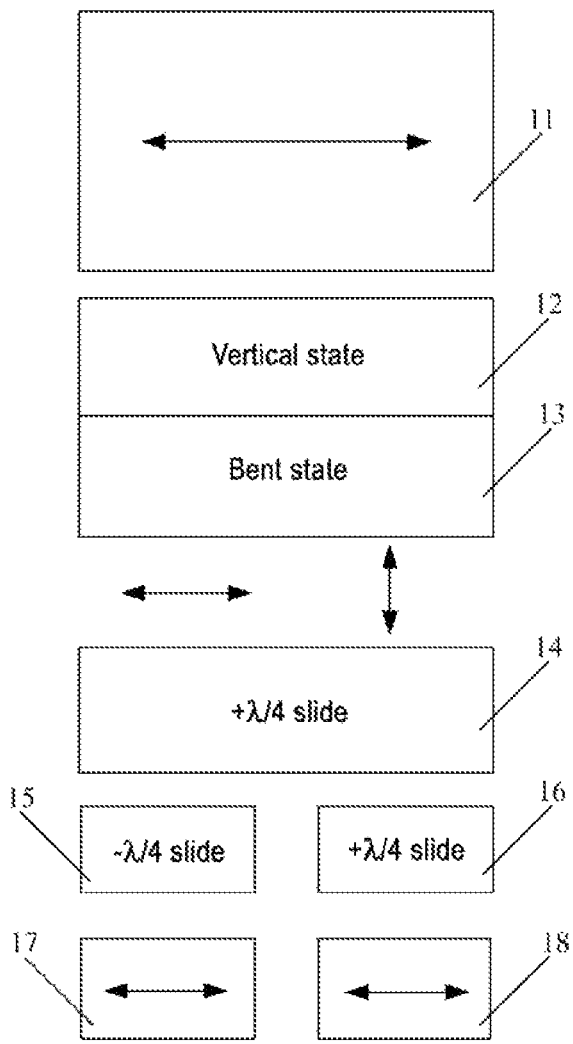
FIG. 1c is a schematic diagram of a working principle of an RDZ system in the prior art.
Figure 1D:
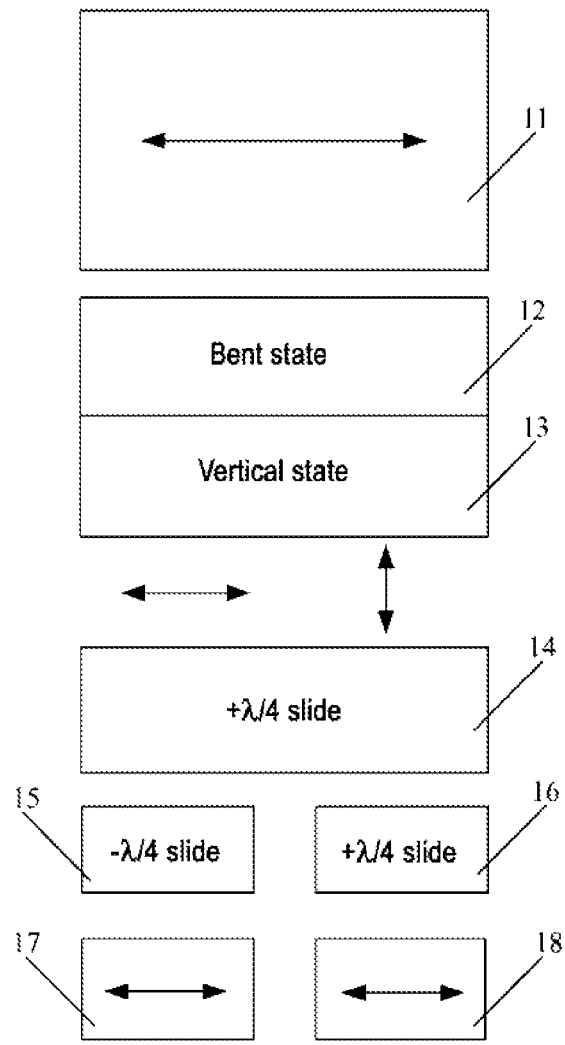
FIG. 1d is a schematic diagram of another working principle of an RDZ system in the prior art.

The first liquid crystal cell 3 may control the polarization direction of the first display picture passing therethrough. If the polarization direction of the first display picture received by the first liquid crystal cell 3 is different from that of the first polarizer 1, that is, if the original polarization direction of the first display picture is different from that of the first polarizer 1, the liquid crystal state of the first liquid crystal cell 3 includes a bent state. As shown in FIG. 1*a*, as the liquid crystal state of the first liquid crystal cell 3 is a bent state, the polarization direction of the first display picture is deflected when the first display picture passes through the first liquid crystal cell 3, so that the polarization direction of the first display picture passing through the first liquid crystal cell 3 is changed to be identical to that of the first polarizer 1. If the polarization direction of the first display picture received by the first liquid crystal cell 3 is identical to that of the first polarizer 1, that is, if the original polarization direction of the first display picture is identical to that of the first polarizer 1, the liquid crystal state of the first liquid crystal cell 3 includes a vertical state. As shown in FIG. 1*b*, as the liquid crystal state of the first liquid crystal cell 3 is a vertical state, the polarization direction of the first display picture is not deflected when the first display picture passes through the first liquid crystal cell 3, so that the polarization direction of the first display picture passing through the first liquid crystal cell 3 remains identical to that of the first polarizer 1.

The second liquid crystal cell 4 may control the polarization direction of the second display picture passing therethrough. If the polarization direction of the second display picture received by the second liquid crystal cell 4 is different from that of the second polarizer 2, that is, if the original polarization direction of the second display picture is different from that of the first polarizer 2, the liquid crystal state of the second liquid crystal cell 4 includes a bent state. As shown in FIG. 1*a*, as the liquid crystal state of the second liquid crystal cell 4 is a bent state, the polarization direction of the second display picture is deflected when the second display picture passes through the second liquid crystal cell 4, so that the polarization direction of the second display picture passing through the second liquid crystal cell 4 is changed to be identical to that of the second polarizer 2. If the polarization direction of the second display picture received by the second liquid crystal cell 4 is identical to that of the second polarizer 2, that is, if the original polarization direction of the second display picture is identical to that of the second polarizer 2, the liquid crystal state of the second liquid crystal cell 4 includes a vertical state. As shown in FIG. 1*b*, as the liquid crystal state of the second liquid crystal cell 4 is a vertical state, the polarization direction of the second display picture is not deflected when the second display picture passes through the second liquid crystal cell 4, so that the polarization direction of the second display picture passing through the second liquid crystal cell 4 remains identical to that of the second polarizer 2.

In this embodiment, the polarization direction of the first polarizer 1 and the polarization direction of the second polarizer 2 may be set in advance. The polarization direction of the first polarizer 1 and the polarization direction of the second polarizer 2 may be identical or different. When the polarization direction of the first polarizer 1 and the polarization direction of the second polarizer 2 are identical, preferably, both the polarization direction of the first polarizer 1 and the polarization direction of the second polarizer 2 are a horizontal direction or a vertical direction. When the polarization direction of the first polarizer 1 and the polarization direction of the second polarizer 2 are different, preferably, the polarization direction of the first polarizer 1 is vertical to the polarization direction of the second polarizer 2. For example, when the polarization direction of the first polarizer 1 is a horizontal direction, the polarization direction of the second polarizer 2 is a vertical direction; or, if the polarization direction of the first polarizer 1 is a vertical direction, the polarization direction of the second polarizer 2 is a horizontal direction.

In this embodiment, when one frame of display picture is displayed, the polarization direction of the first display picture is different from that of the second display picture. Preferably, the polarization direction of the first display picture is vertical to that of the second display picture. For example, when the polarization direction of the first display picture is a horizontal direction, the polarization direction of the second display picture is a vertical direction; or, if the polarization direction of the first display picture is a vertical direction, the polarization direction of the second display picture is a horizontal direction.

In this embodiment, in two adjacent frames of display pictures, the polarization directions of the first display pictures are different, and the polarization directions of the second display pictures are different. Preferably, in two adjacent frames of display pictures, the polarization directions of the first display pictures are vertical to one another, and the polarization directions of the second display pictures are vertical to one another.

In the technical solution of the three-dimensional display device provided by this embodiment, the first polarizer is provided thereon with a first liquid crystal cell and the second polarizer is provided thereon with a second liquid crystal cell, so it is unnecessary to arrange any liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced. Meanwhile, it is unnecessary to arrange λ/4 slides on the first polarizer, the second polarizer and the display panel, so the production cost is further reduced, and the technological process is simplified.

The technical solutions of the present invention will be described in details below by specific Embodiment 3. FIG.

Figure 4A:
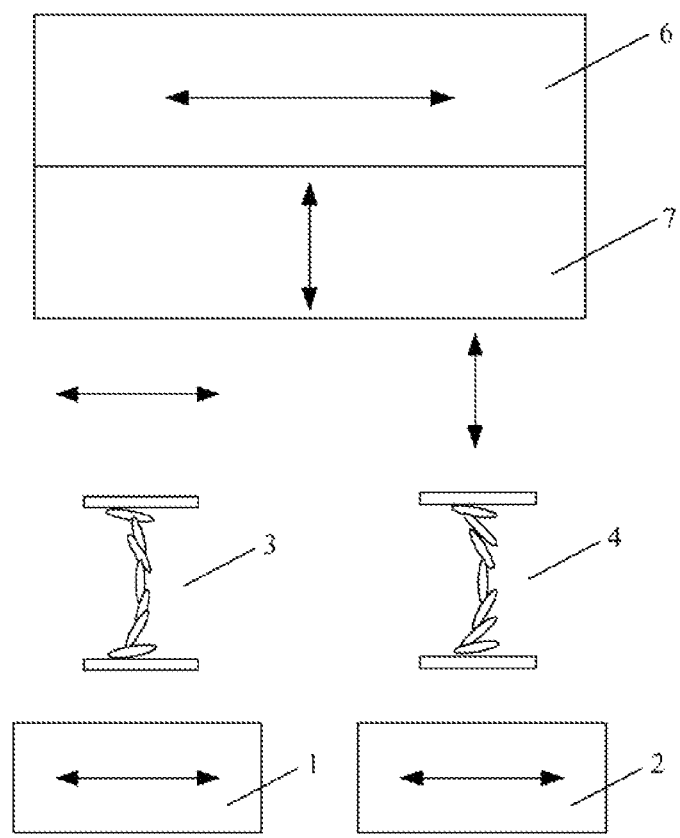
FIG. 4a is a schematic diagram of a working principle of a three-dimensional display device according to Embodiment 3 of the present invention.
Figure 4B:
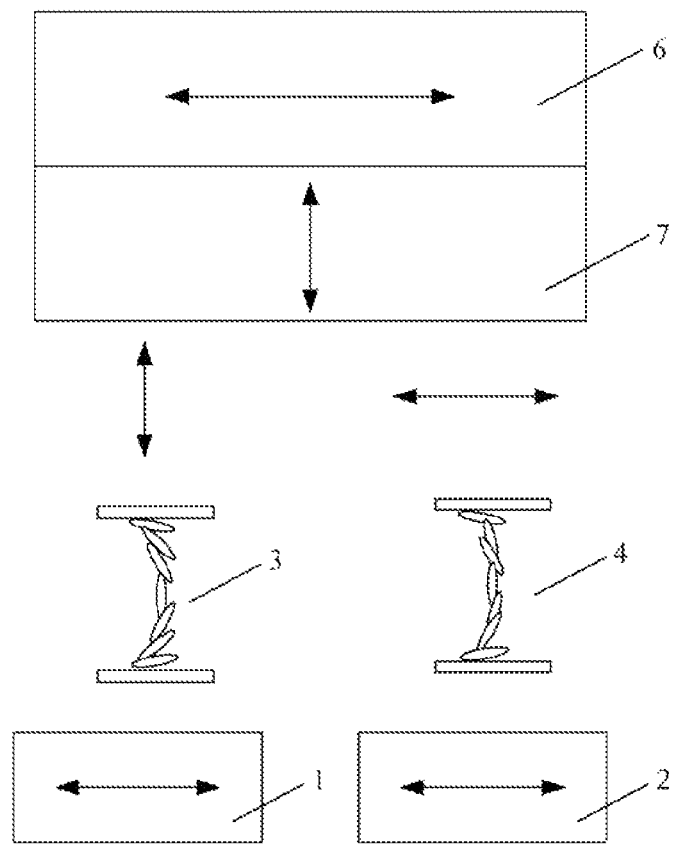
FIG. 4b is a schematic diagram of another working principle of a three-dimensional display device according to Embodiment 3 of the present invention.

4a is a schematic diagram of a working principle of a three-dimensional display device according to Embodiment 3 of the present invention, and FIG. 4b is a schematic diagram of another working principle of a three-dimensional display device according to Embodiment 3 of the present invention, wherein FIG. 4a shows the working principle of the $n^{th}$ frame of display picture, and FIG. 4b shows the working principle of the $(n+1)^{th}$ frame of display picture.

As shown in FIG. 4a, a display panel includes a display region 6 and a display region 7. The display region 6 is located above the display region 7. The display region 6 is configured to display a first display picture, and the display region 7 is configured to display a second display picture. The $n^{th}$ frame of display picture includes the first display picture displayed by the display region 6 and the second display picture displayed by the display region 7; and, the polarization direction of the first display picture is a horizontal direction, and the polarization direction of the second display picture is a vertical direction. The liquid crystal state of the first liquid crystal cell 3 is a vertical state, and the liquid crystal state of the second liquid crystal cell 4 is a bent state. The polarization direction of the first polarizer 1 is a horizontal direction, and the polarization direction of the second polarizer 2 is a horizontal direction. In the process of displaying the $n^{th}$ frame of display picture, the first liquid cell 3 receives the first display picture having a horizontal direction as its polarization direction and displayed by the display region 6. As the liquid crystal state of the first liquid crystal cell 3 is a vertical state, the polarization direction of the first display picture passing through the first liquid crystal cell 3 remains unchanged, so that the polarization direction of the first display picture is still the horizontal direction, and the first display picture having a horizontal direction as its polarization direction is thus received by the first polarizer 1 and then received by the left eye of a user after passing through the first polarizer 1. The second liquid cell 4 receives the second display picture having a vertical direction as its polarization direction and displayed by the display region 7. As the liquid crystal state of the second liquid crystal cell 4 is a bent state, the polarization direction of the second display picture passing through the second liquid crystal cell 4 is changed, so that the polarization direction of the second display picture is rotated by 90 degrees and turned to be a horizontal direction, and the second display picture having a horizontal direction as its polarization direction is thus received by the second polarizer 2 and then received by the right eye of the user after passing through the second polarizer 2.

As shown in FIG. 4b, the display panel includes a display region 6 and a display region 7. The display region 6 is located above the display region 7. The display region 6 is configured to display a second display picture, and the display region 7 is configured to display a first display picture. The $(n+1)^{th}$ frame of display picture includes the second display picture displayed by the display region 6 and the first display picture displayed by the display region 7; and, the polarization direction of the second display picture is a horizontal direction, and the polarization direction of the first display picture is a vertical direction. The liquid crystal state of the first liquid crystal cell 3 is a bent state, and the liquid crystal state of the second liquid crystal cell 4 is a vertical state. The polarization direction of the first polarizer 1 is a horizontal direction, and the polarization direction of the second polarizer 2 is a horizontal direction. In the process of displaying the $(n+1)^{th}$ frame of display picture, the first liquid cell 3 receives the first display picture having a vertical direction as its polarization direction and displayed by the display region 7. As the liquid crystal state of the first liquid crystal cell 3 is a bent state, the polarization direction of the first display picture passing through the first liquid crystal cell 3 is changed, so that the polarization direction of the first display picture is rotated by 90 degrees and turned to be a horizontal direction, and the first display picture having a horizontal direction as its polarization direction is thus received by the first polarizer 1 and then received by the left eye of a user after passing through the first polarizer 1. The second liquid cell 4 receives the second display picture having a horizontal direction as its polarization direction and displayed by the display region 6. As the liquid crystal state of the second liquid crystal cell 4 is a vertical state, the polarization direction of the second display picture passing through the second liquid crystal cell 4 remains unchanged, so that the polarization direction of the second display picture is still the horizontal direction, and the second display picture having a horizontal direction as its polarization direction is thus received by the second polarizer 2 and then received by the right eye of the user after passing through the second polarizer 2.

As shown in FIG. 4a and FIG. 4b, in the process of displaying the $n^{th}$ frame of display picture, the left eye receives the first display picture once, and the right eye receives the second display picture once; and, in the process of displaying the $(n+1)^{th}$ frame of display picture, the left eye receives the first display picture once, and the right eye receives the second display picture once. In conclusion, when both the driving frequency of the first display picture and the driving frequency of the second display picture are 120 Hz, one complete left-eye parallax picture is received by the left eye every 1/60 s, and one complete right-eye parallax picture is received by the right eye every 1/60 s, so that the full-resolution display effect may be realized.

In the technical solution of the three-dimensional display device provided by this embodiment, the first polarizer is provided thereon with a first liquid crystal cell and the second polarizer is provided thereon with a second liquid crystal cell, so it is unnecessary to arrange any liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced. Meanwhile, it is unnecessary to arrange λ/4 slides on the first polarizer, the second polarizer and the display panel, so the production cost is further reduced, and the technological process is simplified.

Figure 5A:
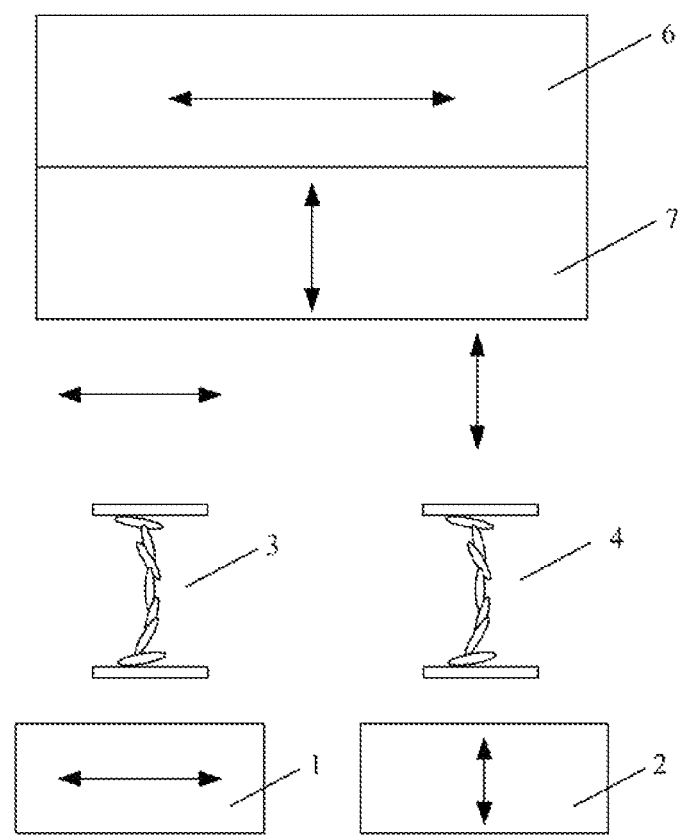
FIG. 5a is a schematic diagram of a working principle of a three-dimensional display device according to Embodiment 4 of the present invention.

The technical solutions of the present invention will be described in details below by specific Embodiment 4. FIG. 5a is a schematic diagram of a working principle of a three-dimensional display device according to Embodiment 4 of the present invention, and FIG. 5b is a schematic diagram of another working principle of a three-dimensional display device according to Embodiment 4 of the present invention, wherein FIG. 5a shows the working principle of the $n^{th}$ frame of display picture, and FIG. 5b shows the working principle of the $(n+1)^{th}$ frame of display picture.

As shown in FIG. 5a, a display panel includes a display region 6 and a display region 7. The display region 6 is located above the display region 7. The display region 6 is configured to display a first display picture, and the display region 7 is configured to display a second display picture. The $n^{th}$ frame of display picture includes the first display picture displayed by the display region 6 and the second display picture displayed by the display region 7; and, the polarization direction of the first display picture is a horizontal direction, and the polarization direction of the second display picture is a vertical direction. The liquid crystal state of the first liquid crystal cell 3 is a vertical state, and the liquid crystal state of the second liquid crystal cell 4 is a vertical state. The polarization direction of the first polarizer 1 is a horizontal direction, and the polarization direction of the second polarizer 2 is a vertical direction. In the process of displaying the $n^{th}$ frame of display picture, the first liquid cell 3 receives the first display picture having a horizontal direction as its polarization direction and displayed by the display region 6. As the liquid crystal state of the first liquid crystal cell 3 is a vertical state, the polarization direction of the first display picture passing through the first liquid crystal cell 3 remains unchanged, so that the polarization direction of the first display picture is still the horizontal direction, and the first display picture having a horizontal direction as its polarization direction is thus received by the first polarizer 1 and then received by the left eye of a user after passing through the first polarizer 1. The second liquid cell 4 receives the second display picture having a vertical direction as its polarization direction and displayed by the display region 7. As the liquid crystal state of the second liquid crystal cell 4 is a vertical state, the polarization direction of the second display picture passing through the second liquid crystal cell 4 remains unchanged, so that the polarization direction of the second display picture is still the vertical direction, and the second display picture having a vertical direction as its polarization direction is thus received by the second polarizer 2 and then received by the right eye of the user after passing through the second polarizer 2.

Figure 5B:
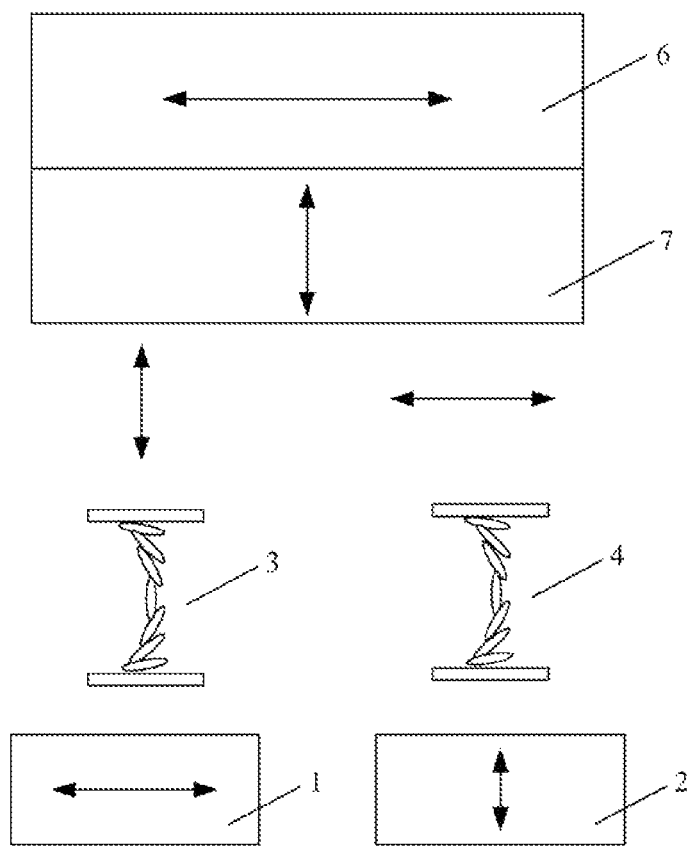
FIG. 5b is a schematic diagram of another working principle of a three-dimensional display device according to Embodiment 4 of the present invention.

As shown in FIG. 5b, the display panel includes a display region 6 and a display region 7. The display region 6 is located above the display region 7. The display region 6 is configured to display a second display picture, and the display region 7 is configured to display a first display picture. The $(n+1)^{th}$ frame of display picture includes the second display picture displayed by the display region 6 and the first display picture displayed by the display region 7; and, the polarization direction of the second display picture is a horizontal direction, and the polarization direction of the first display picture is a vertical direction. The liquid crystal state of the first liquid crystal cell 3 is a bent state, and the liquid crystal state of the second liquid crystal cell 4 is a bent state. The polarization direction of the first polarizer 1 is a horizontal direction, and the polarization direction of the second polarizer 2 is a vertical direction. In the process of displaying the $(n+1)^{th}$ frame of display picture, the first liquid cell 3 receives the first display picture having a vertical direction as its polarization direction and displayed by the display region 7. As the liquid crystal state of the first liquid crystal cell 3 is a bent state, the polarization direction of the first display picture passing through the first liquid crystal cell 3 is changed, so that the polarization direction of the first display picture is rotated by 90 degrees and turned to be a horizontal direction, and the first display picture having the horizontal direction as its polarization direction is thus received by the first polarizer 1 and then received by the left eye of a user after passing through the first polarizer 1. The second liquid cell 4 receives the second display picture having a horizontal direction as its polarization direction and displayed by the display region 6. As the liquid crystal state of the second liquid crystal cell 4 is a bent state, the polarization direction of the second display picture passing through the second liquid crystal cell 4 is changed, so that the polarization direction of the second display picture is rotated by 90 degrees and turned to be a vertical direction, and the second display picture having a vertical direction as its polarization direction is thus received by the second polarizer 2 and then received by the right eye of the user after passing through the second polarizer 2.

As shown in FIG. 5a and FIG. 5b, in the process of displaying the $n^{th}$ frame of display picture, the left eye receives the first display picture once, and the right eye receives the second display picture once; and, in the process of displaying the $(n+1)^{th}$ frame of display picture, the left eye receives the first display picture once, and the right eye receives the second display picture once. In conclusion, when both the driving frequency of the first display picture and the driving frequency of the second display picture are 120 Hz, one complete left-eye parallax picture is received by the left eye every 1/60 s, and one complete right-eye parallax picture is received by the right eye every 1/60 s, so that the full-resolution display effect may be realized.

In the technical solution of the three-dimensional display device provided by this embodiment, the first polarizer is provided thereon with a first liquid crystal cell and the second polarizer is provided thereon with a second liquid crystal cell, so it is unnecessary to arrange any liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced. Meanwhile, it is unnecessary to arrange λ/4 slides on the first polarizer, the second polarizer and the display panel, so the production cost is further reduced, and the technological process is simplified.

Embodiment 5 of the present invention provides a three-dimensional display system. The three-dimensional display system includes a display panel for displaying a first display picture and a second display picture and a three-dimensional display device, wherein the three-dimensional display device may be the three-dimensional display device provided by Embodiment 2, Embodiment 3 or Embodiment 4, and will not be repeated redundantly here.

In the present invention, preferably, the display panel may be an Organic Light-Emitting Diode (OLED for short hereinafter) panel or a plasma panel. That is, the display panel includes an organic light-emitting diode display unit or a plasma display unit.

In the technical solution of the three-dimensional display system provided by this embodiment, the display panel includes a plurality of display regions for displaying a first display picture and a second display picture in a partition and polarization manner. As liquid crystal cells are arranged on the first polarizer and the second polarizer, respectively, it is unnecessary to arrange any liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced. Meanwhile, it is unnecessary to arrange λ/4 slides on the first polarizer, the second polarizer and the display panel, so the production cost is further reduced, and the technological process is simplified.

Figure 6:
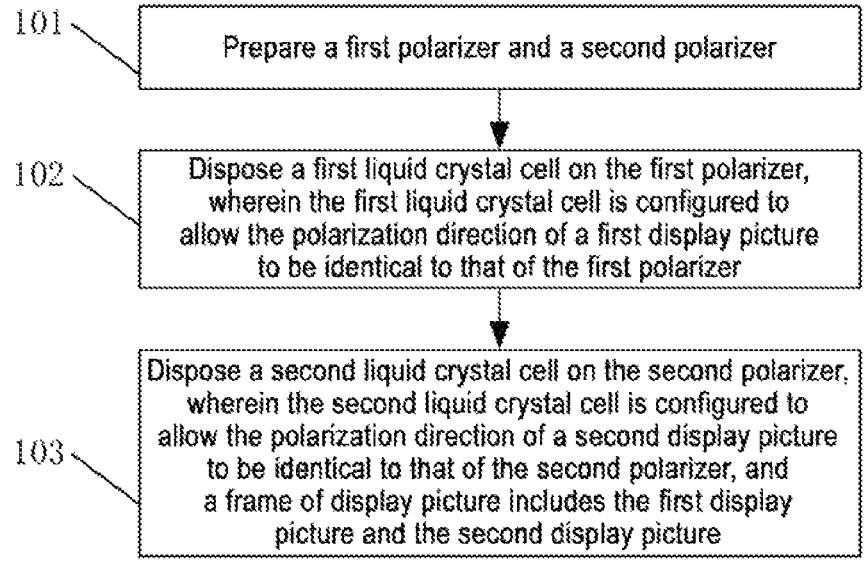
FIG. 6 is a flowchart of a manufacturing method of a three-dimensional display device according to Embodiment 6 of the present invention.

FIG. 6 is a flowchart of a manufacturing method of a three-dimensional display device according to Embodiment 6 of the present invention. As shown in FIG. 6, the method includes the following steps:

Step 101: A first polarizer and a second polarizer are prepared.

Step 102: A first liquid crystal cell for allowing the polarization direction of a first display picture to be identical to that of the first polarizer is arranged on the first polarizer.

This step may include: attaching the first liquid crystal cell onto the first polarizer. Specifically, the first liquid crystal cell may be directly adhered to the first polarizer.

Step 103: A second liquid crystal cell for allowing the polarization direction of a second display picture to be identical to that of the second polarizer is arranged on the second polarizer, wherein a frame of display picture includes the first display picture and the second display picture, and the polarization direction of the first display picture is different from that of the second display picture when one frame of display picture is displayed.

This step may include: attaching the second liquid crystal cell onto the second polarizer. Specifically, the second liquid crystal cell may be directly adhered to the second polarizer.

The execution order of step 102 and step 103 may be altered according to actual production requirements.

The manufacturing method of a three-dimensional display device provided by this embodiment may be used for manufacturing the three-dimensional display device provided by Embodiment 2, Embodiment 3 or Embodiment 4, so the specific description may refer to Embodiment 2, Embodiment 3 or Embodiment 4.

In the technical solution of the manufacturing method of a three-dimensional display device provided by this embodiment, the first polarizer is provided thereon with a first liquid crystal cell and the second polarizer is provided thereon with a second liquid crystal cell, so it is unnecessary to arrange any liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced. Meanwhile, it is unnecessary to arrange $\lambda/4$ slides on the first polarizer, the second polarizer and the display panel, so the production cost is further reduced, and the technological process is simplified.

Figure 7:
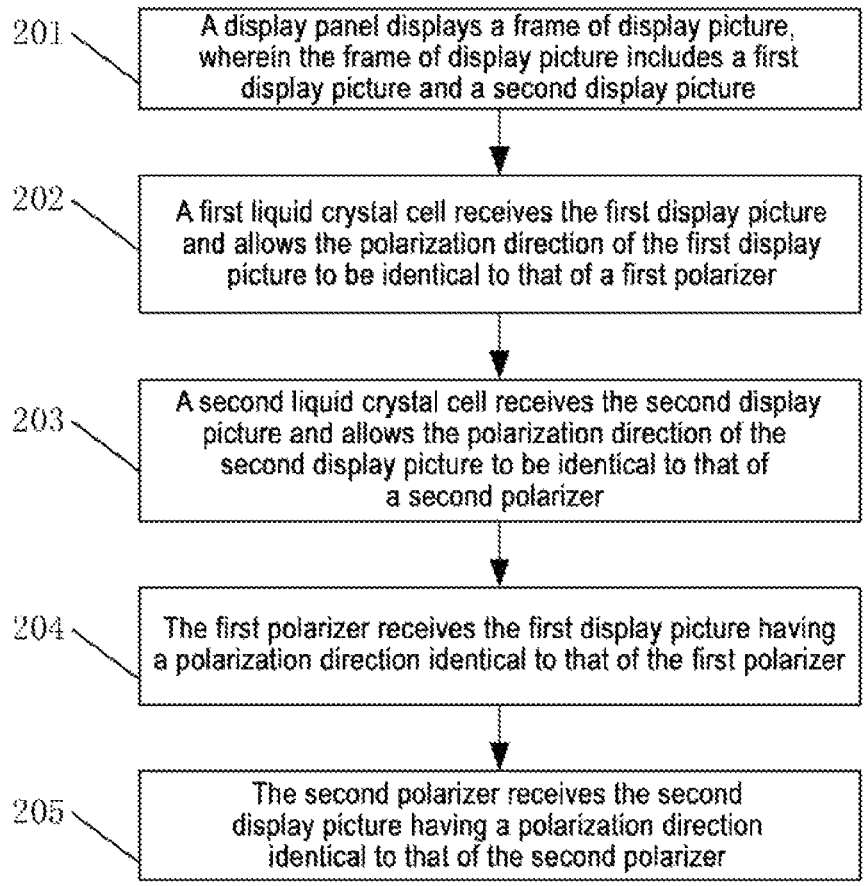
FIG. 7 is a flowchart of a three-dimensional display method according to Embodiment 7 of the present invention.

FIG. 7 is a flowchart of a three-dimensional display method according to Embodiment 7 of the present invention. The three-dimensional display method is based on the three-dimensional display system provided by Embodiment 5. As shown in FIG. 7, the method includes the following steps:

Step 201: A display panel displays one frame of display picture, wherein this frame of display picture includes a first display picture and a second display picture, and the polarization direction of the first display picture is different from that of the second display picture.

Step 202: A first liquid crystal cell receives the first display picture and allows the polarization direction of the first display picture to be identical to that of a first polarizer.

Step 203: A second liquid crystal cell receives the second display picture and allows the polarization direction of the second display picture to be identical to that of a second polarizer.

Step 204: The first polarizer receives the first display picture having a polarization direction identical to that of the first polarizer.

Step 205: The second polarizer receives the second display picture having a polarization direction identical to that of the second polarizer.

The execution order of the above steps may be altered according to actual production requirements.

The three-dimensional display method provided by this embodiment is based on the three-dimensional display system provided by Embodiment 5. The first liquid crystal cell receives the first display picture and allows the polarization direction of the first display picture to be identical to that of the first polarizer, and the second liquid crystal cell receives the second display picture and allows the polarization direction of the second display picture to be identical to that of the second polarizer, so three-dimensional display may be realized without arranging any liquid crystal cell on the display panel. As both the first polarizer and the second polarizer are small in size, the required raw material of the liquid crystal cells is less, and the technological process of attaching the liquid crystal cells onto the first polarizer and the second polarizer is simpler, so that the production cost is reduced. Meanwhile, it is unnecessary to arrange $\lambda/4$ slides on the first polarizer, the second polarizer and the display panel, so the production cost is further reduced, and the technological process is simplified.

It should be understood that the foregoing implementations are merely exemplary implementations for describing the principle of the present invention, but the present invention is not limited thereto. A person of ordinary skill in the art may make various modifications and improvements without departing from the spirit and essence of the present invention, and these modifications and improvements are also deemed as falling into the protection scope of the present invention.

The invention claimed is:

1. A display panel, comprising a plurality of display regions, characterized in that at least one of the plurality of display regions is a first display region, and each of the plurality of display regions that is not a first display region is a second display region, the first display region is provided with a first sub-polarizer, the second display region is provided with a second sub-polarizer, and a polarization direction of the first sub-polarizer is different from that of the second sub-polarizer; a frame of display picture comprises a first display picture and a second display picture; and, when this frame of display picture is displayed, the first display picture and the second display picture are respectively displayed at the first display region and the second display region so that a polarization direction of the linearly polarized light of the first display picture is different from that of the linearly polarized light of the second display picture.

2. The display panel according to claim 1, characterized in that the number of the plurality of display regions that is the first display region is equal to that of the plurality of display regions that is the second display region.

3. The display panel according to claim 1, characterized in that there is one first display region, and there is one second display region.

4. The display panel according to claim 1, characterized in that, in two adjacent frames of display pictures, the polarization directions of the linearly polarized light of the first display pictures are different and the polarization directions of the linearly polarized light of the second display pictures are different.

5. The display panel according to claim 1, characterized in that the display panel comprises an organic light-emitting diode display unit or a plasma display unit.

6. The display panel according to claim 2, characterized in that the display panel comprises an organic light-emitting diode display unit or a plasma display unit.

7. The display panel according to claim 3, characterized in that the display panel comprises an organic light-emitting diode display unit or a plasma display unit.

8. The display panel according to claim 4, characterized in that the display panel comprises an organic light-emitting diode display unit or a plasma display unit.

9. A three-dimensional display device, comprising a first polarizer and a second polarizer, characterized in that the first polarizer is provided thereon with a first liquid crystal cell for allowing the polarization direction of the linearly polarized light of a first display picture incident on the three-dimensional display device to be identical to that of the first polarizer; the second polarizer is provided thereon with a second liquid crystal cell for allowing the polarization direction of the linearly polarized light of a second display picture incident on the three-dimensional display device to be identical to that of the second polarizer; a frame of display picture comprises the first display picture and the second display picture; and, when this frame of display picture is displayed, the polarization direction of the linearly polarized light of the first display picture incident on the three-dimensional display device is different from that of the second display picture.

10. The three-dimensional display device according to claim 9, characterized in that,
if the polarization direction of the linearly polarized light of the first display picture incident on the three-dimensional display device received by the first liquid crystal cell is different from that of the first polarizer, the liquid crystal state of the first liquid crystal cell comprises a bent state; or
if the polarization direction of the linearly polarized light of the first display picture incident on the three-dimensional display device received by the first liquid crystal cell is identical to that of the first polarizer, the liquid crystal state of the first liquid crystal cell comprises a vertical state.

11. The three-dimensional display device according to claim 9, characterized in that,
if the polarization direction of the linearly polarized light of the second display picture incident on the three-dimensional display device received by the second liquid crystal cell is different from that of the second polarizer, the liquid crystal state of the second liquid crystal cell comprises a bent state; or
if the polarization direction of the linearly polarized light of the second display picture incident on the three-dimensional display device received by the second liquid crystal cell is identical to that of the second polarizer, the liquid crystal state of the second liquid crystal cell comprises a vertical state.

12. The three-dimensional display device according to claim 9, characterized in that the polarization direction of the first polarizer is identical to that of the second polarizer, or the polarization direction of the first polarizer is vertical to that of the second polarizer.

13. The three-dimensional display device according to claim 9, further comprising a mirror bracket, characterized in that the first polarizer, the second polarizer, the first liquid crystal cell arranged on the first polarizer and the second liquid crystal cell arranged on the second polarizer are all arranged on the mirror bracket.

14. The three-dimensional display device according to claim 10, further comprising a mirror bracket, characterized in that the first polarizer, the second polarizer, the first liquid crystal cell arranged on the first polarizer and the second liquid crystal cell arranged on the second polarizer are all arranged on the mirror bracket.

15. The three-dimensional display device according to claim 11, further comprising a mirror bracket, characterized in that the first polarizer, the second polarizer, the first liquid crystal cell arranged on the first polarizer and the second liquid crystal cell arranged on the second polarizer are all arranged on the mirror bracket.

16. The three-dimensional display device according to claim 12, further comprising a mirror bracket, characterized in that the first polarizer, the second polarizer, the first liquid crystal cell arranged on the first polarizer and the second liquid crystal cell arranged on the second polarizer are all arranged on the mirror bracket.

17. A manufacturing method of a three-dimensional display device, comprising the following steps:
preparing a first polarizer and a second polarizer;
disposing a first liquid crystal cell on the first polarizer, wherein the first liquid crystal cell is configured to allow the polarization direction of the linearly polarized light of a first display picture incident on the three-dimensional display device to be identical to that of the first polarizer; and
disposing a second liquid crystal cell on the second polarizer, wherein the second liquid crystal cell is configured to allow the polarization direction of the linearly polarized light of a second display picture incident on the three-dimensional display device to be identical to that of the second polarizer, a frame of display picture comprises the first display picture and the second display picture, and the polarization direction of the linearly polarized light of the first display picture incident on the three-dimensional display device is different from that of the second display picture when this frame of display picture is displayed.

18. The manufacturing method of a three-dimensional display device according to claim 17, characterized in that:
the step of disposing a first liquid crystal cell on the first polarizer comprises: attaching the first liquid crystal cell onto the first polarizer; and
the step of disposing a second liquid crystal cell on the second polarizer comprises: attaching the second liquid crystal cell onto the second polarizer.

* * * * *